UNITED STATES PATENT OFFICE 2,409,133

N-SUBSTITUTED DERIVATIVES OF 5-AMINO-1,3-BENZODIOXOLES

Hans Z. Lecher, Plainfield, and John P. Goulding, Neshanic Station, N. J., assignors to American Cyanamid Company, New York, N. Y., a corporation of Maine No Drawing. Application December 10, 1943, Serial No. 513,735

3 Claims. (Cl. 260—338)

This invention relates to a new series of chemical compounds, comprising organic derivatives of 5-amino-1,3-benzodioxole, which may be represented as having the following structure:

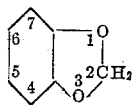

useful as intermediates in the production of dyestuffs. The invention also contemplates dyestuffs derived therefrom.

More particularly, the present invention relates to N-substituted derivatives of the aminobenzodioxole, the N-substituent being a para-aminophenyl radical, represented and numbered for purposes of the present invention as

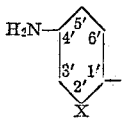

in which X may represent a hydrogen, halogen, nitro, carboxy or sulfonic radicals, the acyl radical of a carboxylic acid, or a sulfonamide group.

The instant application relates to the new organic bases per se. Azo dyes, particularly ice-colors, having novel color shades and unusual fastness properties may be derived therefrom. These new dyestuffs comprise the subject matter of our copending application for United States Letters Patent, Serial No. 513,738, filed of even date.

Very few aromatic amino compounds have been known which produce on diazotization and coupling with an ice-color coupling component strong blue to violet shades. It is one of the principal objects of the present invention to produce a new series of bases and ice-colors derived therefrom which will have these desirable shades. It is a further object of the invention to produce a series of bases suitable for the production of other azo dyes and to develop such dyes therefrom.

In general, the principal objects of the present invention are accomplished by condensing the amino-1,3-benzodioxole with a para-nitrohalogenobenzene and subsequently reducing the nitro group to an amino group. The resulting new compounds, after diazotization and coupling, yield dyestuffs which have the desired properties.

Either para-nitrohalogenobenzene or a para-nitrohalogenobenzene containing a negative substituent ortho to the halogen radical may be used as a starting material. These negative substituents may include radicals such as halogen, nitro, carboxy, or sulfonic radicals, the acyl radical of a carboxylic acid or a sulfonamide group. In any case, after condensation and reduction the product constitutes an N-para-aminophenyl-substituted aminobenzodioxole. Therefore, as used in the instant application, the expression "a para-aminophenyl radical" includes not only the para-aminophenyl radical, but also those 2'-substituted-4'-amino-phenyl groups in which the negative substituents are present.

Similarly, for the purposes of the present invention, the expression "a sulfonamide radical" is used to designate not only the

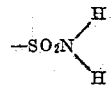

group, but also N-substituted-sulfonamides. In the latter case the sulfonamide group may be one in which either or both of the hydrogens are substituted by an alkyl or aryl radical or one in which the substituents form with the nitrogen a heterocyclic ring such as a sulfonpiperidide, sulfonmorpholide or the like.

Those para-nitrohalogenobenzenes containing negative substituents, ortho to the halogen radical, are particularly useful. When such materials are used, condensation proceeds smoothly in aqueous media. The invention, however, is not necessarily so limited. Condensation may be carried out in any solvent compatible with the solubility and reactivity of the particular nitrohalogenobenzene employed. In some cases, an anhydrous solvent such as nitrobenzene or the like is required. In some cases, also, the use of a cupriferous catalyst may be of advantage. Generally too, it is well to provide an acid binder such as a metal oxide, carbonate or the like.

Reduction of the nitro to an amino group may be carried out either by alkaline or by acidic reducing agents. The pH will determine whether free bases or salts will be produced. It will be apparent that two different types of salts are possible. There may be acid salts of the base. On the other hand, when a negative substituent such as a carboxylic or sulfonic group is present on the p-aminophenyl radical, the acidic substituent may be neutralized to form a salt. Both types of salts as well as the free bases are useful. Each may be converted to the others by appropriate treatment. Reference to the new bases in the instant specification and claims is therefore intended to include not only the bases themselves but also both types of salts thereof.

Diazotization of some bases of the present invention in mineral acid solution by nitrous acid produces, according to the conditions imposed, two different products. In general, use of higher temperatures, greater concentration of the base in solution, higher mineral acid concentration and excess nitrous acid generally lead to formation of an N-nitroso derivative of the diazonium salts. Lower temperature, lower acid concentrations and controlled nitrous acid addition lead to formation of the diazonium chloride itself.

In general, the N-nitroso diazotization products lead to the production of different, duller and less desirable shades when coupled. The simple diazotized product leads to the production of the more valuable and faster shades. Conversion of the N-nitroso colors to the more desirable shades is accomplished through hydrolysis of the former. This may be accomplished by heating the N-nitroso derivatives in dilute solutions of some alkaline material such as soda ash or the like. Reducing agents such as sodium sulfide, sodium bisulfite or their equivalents may be included in the saponification bath to destroy nitric oxides as they are liberated.

In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases or of the diazo salts.

The bases of the present invention may be also converted into diazo-sulfonates. If the basic portion of these diazo-sulfonates is free from solubilizing groups, they may be blended with appropriate ice-color coupling components and oxidizing agents. Such blends may be incorporated into a printing paste, printed on vegetable fibers and the pigment developed by treatment with steam.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the diazotized bases of the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetylamino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxyphenylamine; particularly the various N-substituted amides such as arylides, of 5,6,7,8-tetrahydro-2-hydroxy-3-naphthoic acid, of 2-hydroxy-3-anthroic acid, of methyl and dimethyl salicyclic acids, of hydroxy carbozole carboxylic acids, of hydroxy benzocarbazole carboxylic acids, of hydroxy-benzoacridone carboxylic acids, of 3,7-dihydroxy-naphthalene-2,6-dicarboxylic acid, of hydroxydibenzofuran carboxylic acids, of hydroxy benzothiophene carboxylic acids, etc., and the arylides of acetoacetic acid, furoyl acetic acid, benzoyl acetic acid, terphthabyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids such as e. g., R acid, G acid, the Cleve's acids, J acid, gamma acid, J-acid urea and J-acid imide, H acid and many others. Pyrazolones such as sulfonic derivatives of 1-phenyl-3-methyl pyrazolone-5 also may be used.

If so desired, the new diazo components of the present invention also may be used for the production of dis- and poly-azo dyes in accordance with the customary procedures. Depending upon their structure, the dyes obtained from the new bases are direct dyes, acid wool dyes or chrome dyes. In each group, a great many of them have very valuable dyeing and fastness properties.

This invention will be more fully illustrated in conjunction with the following examples which are meant to be illustrative only and not by way of limitation. All parts are by weight unless otherwise noted.

*Example 1*

2.3 parts of 5-amino-1,3-benzodioxole are condensed with 3.3 parts of sodium 2-chloro-5-nitrobenzene sulfonate (62%) in 20 parts of water in the presence of 1.3 parts of calcium carbonate for 24 hours at reflux. At this time, 5 parts of water and 3 parts of ammonium chloride are added and the reaction mixture is boiled while 2 parts of zinc dust are slowly added. After refluxing for 1 hour, 0.1 part of sodium sulfite is added and the reaction product is precipitated by pouring into 4 parts of concentrated hydrochloric acid. The resulting precipitate of N-(2'-sulfo-4'-aminophenyl) 5-amino-1,3-benzodioxole is filtered and dried. It has the structural formula:

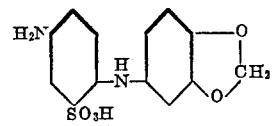

*Example 2*

2.3 parts of N-(2'-sulfo-4'-aminophenyl)-5-amino-1,3-benzodioxole are refluxed with 33 parts of 25% hydrochloric acid in the presence of 0.3 part of stannous chloride. When solution is complete, 25 parts of water are added to the reaction mixture which is poured into an excess of dilute caustic containing a small quantity of sodium hydrosulfite. The precipitated product is filtered and is slurried with a small quantity of concentrated hydrochloric acid and the resulting hydrochloride of N-(4'-aminophenyl)-5-amino-1,3-benzodioxole is filtered and dried. It has the following formula:

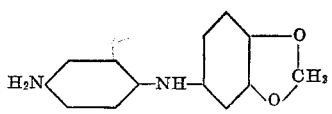

Example 3

0.3 part of the product of Example 2 is dissolved in 4.3 parts of 20% hydrochloric acid and at 10° C. is diazotized by the addition of sodium nitrite to a permanent test against starch-iodide. Sodium bicarbonate is added to the diazotization mixture until the solution is approximately neutral. At this point, 5 parts of water are added and this bath is used to dye cotton piece goods previously impregnated with 2-hydroxy-3-naphthoic acid anilide. The strong reddish dyeing is rinsed in fresh water, boiled in 5% sodium carbonate solution, soaped at elevated temperature, rinsed and dried. The cloth is dyed levelly a strong blue.

Example 4

2.1 parts of N-(2'-sulfo-4'-aminophenyl)-5-amino-1,3-benzodioxole as obtained in Example 1 are stirred in 60 parts of water containing 3.9 parts of hydrochloric acid (1.19) and at low temperature are diazotized by a solution of 0.7 parts of sodium nitrite in 10 parts of water. 2.6 parts of symmetrical di-(5,5'-hydroxy-7,7'-sulfo-2,2'-naphthyl) urea are dissolved in 80 parts of water with 5.2 parts of soda ash and at low temperature the above prepared diazo is slowly added. When coupling is complete, the dark solution is treated with salt and the resulting dark precipitate is filtered off, washed on the filter with 10% salt solution and dried at 55° C. A dark blue powder results which is soluble in water, yielding a deep blue solution.

Example 5

0.5 part of the dyestuff as obtained in Example 4 is dissolved in 500 parts of water and one-tenth of this solution is diluted with 125 parts of water. 10 parts of a 10% salt solution are added and then 5 parts of a previously wet-out cotton skein are entered into this dye bath. The temperature is rapidly raised to the boil while the skein is frequently turned in the dye bath, and is maintained at the boil for 1 hour. The skein is then removed from the dye bath, rinsed in fresh water, treated at 60° C., in a 1% soap solution, again rinsed and finally dried. The skein is evenly dyed a deep blue of brilliant shade.

We claim:

1. Chemical compounds selected from the group consisting of derivatives of 5-amino-1,3-benzodioxole represented by the formula

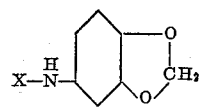

in which X represents a mononuclear para-amino-phenyl radical and the salts of said compounds.

2. A chemical compound selected from the group consisting of

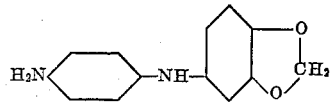

and the salts thereof.

3. A chemical compound according to claim 1 in which X represents a mononuclear 2'-substituted-4'-aminophenyl radical, the 2'-substituent being a sulfonic radical.

HANS Z. LECHER.
JOHN P. GOULDING.